THOMAS COOK.
Improvement in Liquid-Meters.

No. 114,411.  Patented May 2, 1871.

Witnesses  Inventor

UNITED STATES PATENT OFFICE.

THOMAS COOK, OF NEW YORK, N. Y.

IMPROVEMENT IN LIQUID-METERS.

Specification forming part of Letters Patent No. 114,411, dated May 2, 1871.

*To all whom it may concern:*

Be it known that I, THOMAS COOK, of New York, in the county and State of New York, have invented a new and Improved Liquid-Meter; and I do hereby declare the following to be a full, clear, and exact description of the same, reference being had to the accompanying drawing, forming part of this specification, in which—

Figure 1:
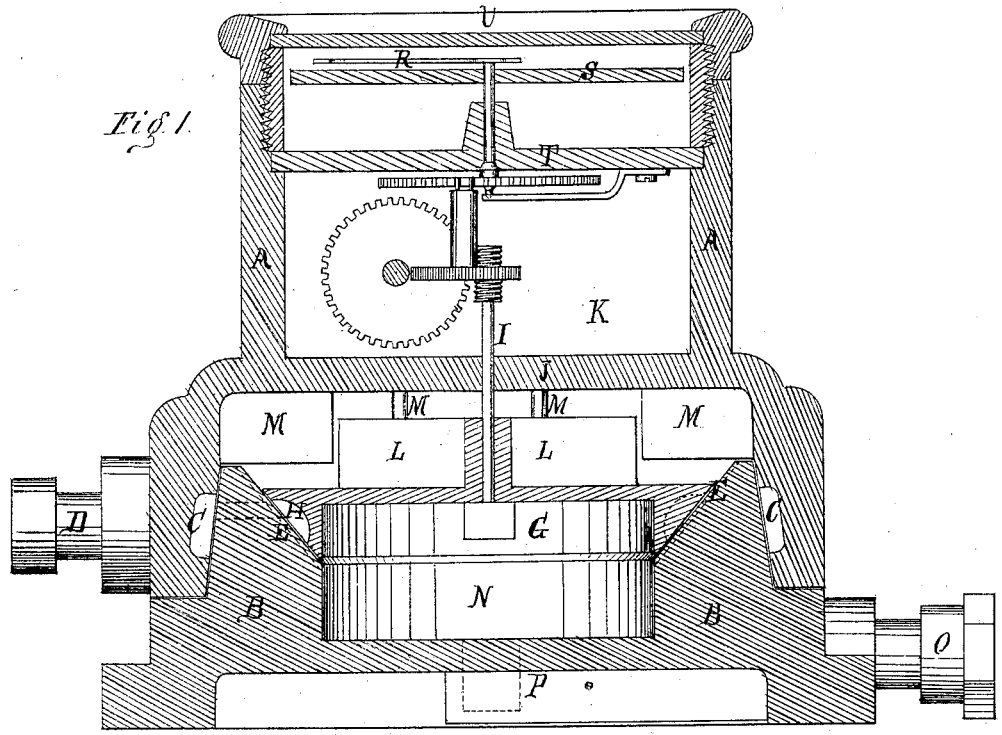
Figure 2:
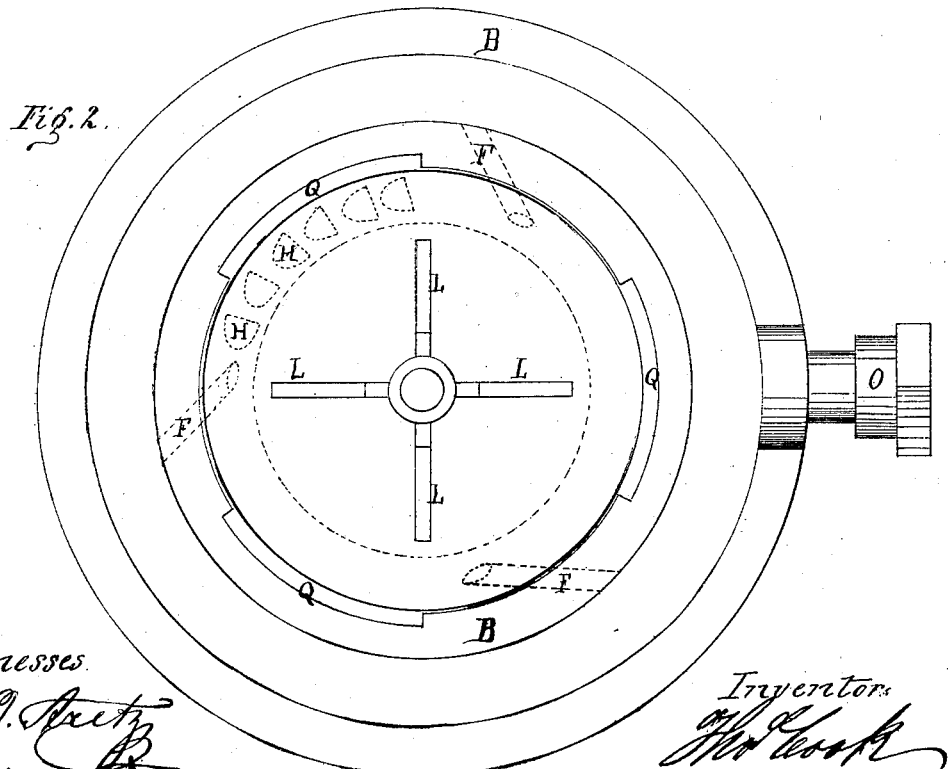

Figure 1 is a vertical section, and Fig. 2 a plan view, of the lower portion of the meter.

Similar letters of reference indicate corresponding parts in the several figures of the drawing.

My invention has for its object to measure the quantity of water or other liquid passing through the meter by means of a valve so arranged as to rotate with little or no friction, and communicating its motion to a suitable indicating or registering apparatus.

It has, further, for its object to regulate the speed of the valve by means of vanes applied to its upper surface, working in connection with corresponding vanes affixed to the walls of the chamber containing the valve, as will be hereinafter more fully described.

In the accompanying drawing, A is the upper portion of the meter, fitting by a conical seat upon the lower portion, B. The inner circumference of the part A adjoining the seat is provided with an annular recess, C, which communicates directly with the supply or induction pipe D.

E is the valve-seat, formed in the lower portion of the meter, beveled inward, as shown, and communicating with the annular recess C by means of the oblique openings or passages F.

G is the valve, having a beveled face corresponding to the inclination of the seat, and provided with peripheral buckets or recesses H. (Indicated by dotted lines in Fig. 2.)

The valve-stem I extends upward through the partition J and into the chamber K, containing the registering mechanism, with which it is connected by suitable gearing. Upon the upper surface of the valve, around its stem, are arranged four (more or less) radial arms or vanes, L, which are of sufficient length to just clear the ends of corresponding vanes M, affixed to the inner circumference of the part A.

N is the water-chamber beneath the valve, communicating with the discharge-pipe O through the passage P.

The operation is as follows: The water or other liquid enters the annular recess C from the supply-pipe D, and from said recess passes to the peripheral buckets of the valve through the oblique passages F.

The impingement of the liquid tangentially against the face of the valve causes the latter to rotate, and at the same time lifts it sufficiently to clear its seat, and thus prevent friction by the contact of these parts.

It will be observed that there are recesses Q formed in the valve-seat at regular intervals between the passages F, leaving shallow openings around the valve when seated, which recesses serve to establish a communication between the chamber N and the space above the valve. They also serve for the passage around the valve of sand and other foreign matter contained in the water which is too large to pass between the valve and its seat. These recesses also permit the water to act as a brake upon the valve when a large quantity is passing through the meter.

As the valve continues to rotate the water is discharged through the recesses Q into the chamber N, from which it escapes through the discharge-pipe O.

The rotation of the valve communicates motion to the index R, moving over the dial S, through the medium of the valve-stem and gearing, as will be readily understood, the index moving through a certain space at a stated number of revolutions of the valve.

As thus far described, we find that the valve is made to rotate and to record its revolutions upon the dial. The speed of rotation, however, is liable to vary, increasing, of course, from the start until it equals the velocity of the water, and if the latter varies in quantity the speed of the valve will also be changed. The result of this variation in speed is that the index cannot register correctly the quantity of water passed through the meter, and frequently a larger quantity will be discharged than is indicated upon the dial. To overcome this defect I have provided a regulator consisting of the vanes L upon the valve and the vanes M affixed to the shell. As the water enters the lower part of the shell a portion passes to the upper side of the valve until the space above said valve is completely filled. Here it encounters the rotating vanes L, which by centrifugal force throw it outward against the fixed vanes M, thereby breaking the current into innumerable counter-currents, which prevent the valve from rotating beyond a certain predetermined speed. This provision, therefore, prevents the water from acquiring any rotary motion that would unduly affect the valve and its indications.

By shortening or lengthening the vanes L M, or either of them, or by changing their angles, the speed is easily regulated.

The inclination given to the face of the valve serves to steady it upon its seat and hold it in a central position without the necessity of a stem or spindle extending from its under surface.

If desired, the chamber containing the gearing of the registering mechanism may be filled with oil, or other fluid lighter than that under measurement, to exclude the latter from said chamber. By this provision the necessity of a stuffing-box around the valve-stem is avoided.

The dial is separated from the gearing by a horizontal partition, T, and the whole is covered by a transparent cap or cover, U, upon the upper portion of the shell, as clearly shown in Fig. 1.

Having thus described my invention, what I claim as new is—

1. The conical valve G, having the recesses or buckets H in its periphery, and provided with the retarding vanes or wings L, substantially as described.

2. In combination with the above, the stationary vanes M, substantially as specified.

3. In combination with the valve G, constructed as described, the valve-seat and the recesses Q, substantially as set forth.

THOS. COOK.

Witnesses:
  J. A. KNIGHT,
  WM. K. HALL.